United States Patent [19]

Adell

[11] Patent Number: 4,934,100

[45] Date of Patent: Jun. 19, 1990

[54] WIRE INSULATED PLASTIC EDGE GUARD

[76] Inventor: Robert Adell, 200 Adell Blvd., Sunnyvale, Tex. 75182

[21] Appl. No.: 561,245

[22] Filed: Dec. 13, 1983

[51] Int. Cl.⁵ .............................................. B29C 47/02
[52] U.S. Cl. ..................... 49/462; 156/244.11; 264/136; 264/171; 264/174; 264/177.1; 264/295; 425/113; 425/114; 428/31; 428/122
[58] Field of Search ........... 264/171, 174, 136, 177 R, 264/167, 177.1, 295; 425/113, 114; 156/244.11, 244.12; 49/462; 428/31, 122

[56] References Cited

U.S. PATENT DOCUMENTS

| 2,401,550 | 6/1946 | Cook, Jr. ............................ 264/174 |
| 2,954,310 | 9/1960 | Truesdell et al. ..................... 428/31 |
| 2,979,431 | 4/1961 | Perrault ............................... 264/174 |
| 3,068,136 | 12/1962 | Reid .................................. 264/285 |
| 3,886,250 | 5/1975 | Danko ............................ 264/177 R |
| 4,081,504 | 3/1978 | Wenrick et al. .................... 264/285 |
| 4,087,223 | 5/1978 | Angioletti et al. ................... 425/114 |
| 4,259,812 | 4/1981 | Adell ................................... 49/462 |
| 4,316,348 | 2/1982 | Adell ................................... 49/462 |
| 4,334,700 | 6/1982 | Adell ................................... 49/462 |
| 4,338,148 | 7/1982 | Adell ................................. 156/222 |
| 4,365,450 | 12/1982 | Adell ..................................... 52/98 |
| 4,377,056 | 3/1983 | Adell ................................... 49/462 |
| 4,379,376 | 4/1983 | Adell ................................... 49/462 |
| 4,379,377 | 4/1983 | Adell ................................... 49/462 |
| 4,387,125 | 6/1983 | Adell ................................... 428/31 |

FOREIGN PATENT DOCUMENTS

| 2703254 | 8/1978 | Fed. Rep. of Germany ...... 264/174 |
| 52-43230 | 10/1977 | Japan .................................. 264/166 |
| 53-10626 | 4/1978 | Japan .................................. 264/174 |
| 57-176143 | 10/1982 | Japan .................................. 264/167 |
| 58-158216 | 9/1983 | Japan ............................. 156/244.11 |

Primary Examiner—Jeffery Thurlow
Attorney, Agent, or Firm—George L. Boller

[57] ABSTRACT

An edge guard and method of manufacture are disclosed wherein plastic is extruded onto wires which may be individual wires taken from reels or a wire mesh screen.

14 Claims, 2 Drawing Sheets

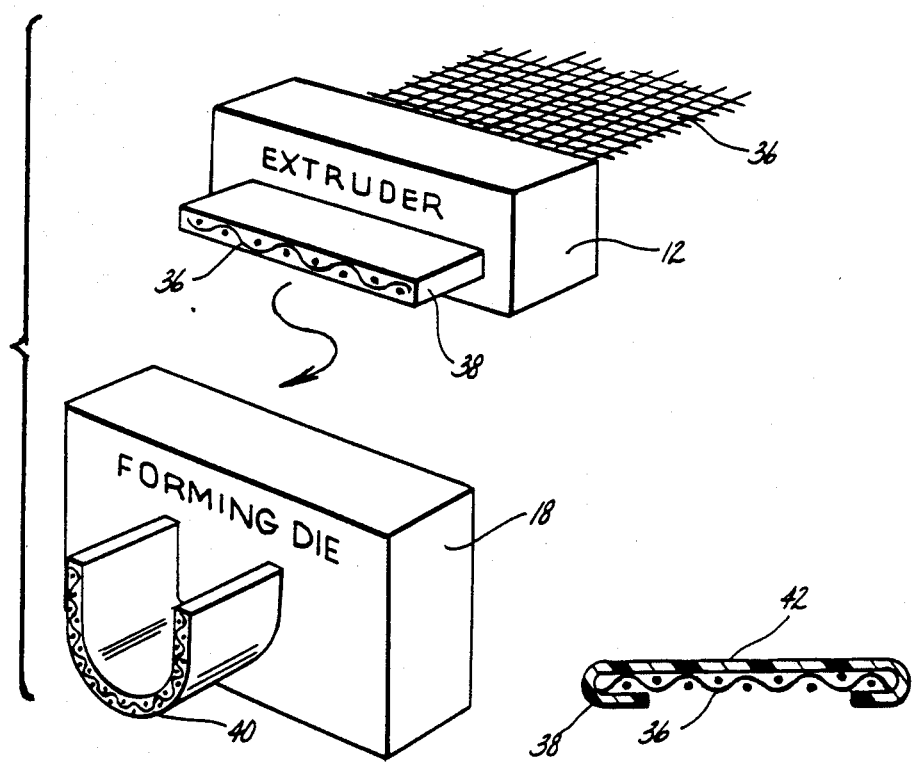
fig. 6
fig. 7
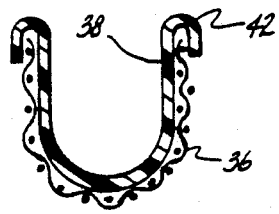
fig. 8

WIRE INSULATED PLASTIC EDGE GUARD

BACKGROUND AND SUMMARY OF THE INVENTION

This invention relates to edge guards such as those which are applied to the trailing edges of swinging closures in automotive vehicles. These products are referred to in the automotive industry as edge guards or door edge guards.

Various types of edge guards are disclosed in many of applicant's issued U.S. patents as well as certain of his pending U.S. patent applications. By way of example reference is made to the following issued patents of applicant relating to insulated metal edge guards.

| | | |
|---|---|---|
| 4,259,812 | 4,338,148 | 4,379,376 |
| 4,316,348 | 4,365,450 | 4,379,377 |
| 4,334,700 | 4,377,056 | 4,387,125 |

Insulated metal edge guards pioneered by applicant have been accepted by the automobile industry and recognized as providing a new and improved product over prior edge guards. While applicant's edge guards afford a number of different types of improvements, perhaps the most significant one is the generic feature of essentially eliminating the possibility of galvanic action (i.e. rusting) occurring between metal of the edge guard and the metal of the door or other object onto which the edge guard is installed. This helps the automobile manufacturers achieve their desired objectives of improving the quality, appearance and life of their products.

Now that new car purchasers are keeping their cars longer because of the very high cost of new cars, it is in the automobile manufacturers' interest to provide products which will maintain their appearance longer without unsightly rusting. Not only does this benefit the original owner, but subsequent owners as well because one person's old car may be another person's new one. Applicant's pioneering efforts with insulated door edge guards predate this current trend toward rust prevention.

It should be recognized that a car's door edges are exposed to potential damage at least twice each time the car is occupied and driven, once when the driver gets in and once when he gets out. Hence, door edge guards provide an important protective function, and this is true regardless of the climate conditions in which the car is used. Certainly salt environments are very severe, such as where salt is used to melt road ice and snow, or along the ocean shore lines. Other environments can also contribute toward the tendency to rusting. Even where coal and sand are used, these materials may have a high salt or acid content which promotes rusting.

In furtherance of enabling the automobile manufacturers to improve both their products and their productivity, applicant is continuing to develop new and useful improvements in edge guards, both in the products per se and in the methods of manufacturing same.

The present invention is directed to a further improvement in an edge guard which provides desired insulative characteristics yet which can be economically fabricated in various configurations and yet can provide new and beneficial appearances and ease of installation.

With the present invention, the use of roll-forming procedures to roll-form metal strips into desired cross sections are not required. Rather the invention in one respect relates to the manufacture of an edge guard by extruding plastic onto a plurality of wires passing through an extruder. The plastic forms a unitary body containing the wires and is formed into a desired cross sectional shape for the edge guard, for example, a U-shaped cross section. In addition to eliminating the use of roll forming procedures, the present invention enables an edge guard to be manufactured which will meet the rigid specifications of automobile companies and with improved productivity.

In prior insulated metal edge guards which are roll-formed into the desired cross sectional shape, it has been necessary to laminate or cast plastic onto metal coils, slit the insulated metal of the coils to desired widths and then roll-form the strips. Where different plastics are involved, not only from the standpoint of the types of plastic materials themselves, but also from the standpoint of colors of the plastics, the manufacturer of an edge guard must inventory a substantial stock of insulated metal in order to meet the demands of automobile companies. With the present invention this is no longer required and hence the invention provides an improved productivity to the ultimate benefit of the consumer. Yet the desired qualities, both decorative and protective, are obtained with an edge guard embodying principles of the invention.

The present application discloses a preferred embodiment of the invention with various specific edge guard embodiments being disclosed. In one embodiment the wires are spaced apart and passed through the extruder as separate longitudinally extending elements. In another embodiment the wires are part of a wire mesh screen. Plastic may be extruded onto the wires selectively to provide various specific cross sections. In some of these cross sections, the wires are completely encapsulated within the cross section; in others a portion is exposed so that when the edge guard is formed into the desired cross sectional shape it presents a decorative appearance. The wires may be of any suitable material, plastic or metal for example, and they provide a structure to the edge guard which in cooperation with the plastic body enables a successful product to be manufactured meeting the required specifications. Neither the plastic by itself nor the wires would be capable of yielding a satisfactory edge guard and it is with the cooperative effect between the two that a successful product results.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 6 is a perspective view similar to FIG. 1 illustrating another example containing principles of the present invention.

FIG. 7 is a transverse cross sectional view through an edge guard made in accordance with FIG. 6 but illustrating a modified form in one stage of manufacture.

FIG. 8 is a cross sectional view illustrating the final cross sectional shape which is imparted to the cross section shown in FIG. 7.

DESCRIPTION OF THE PREFERRED EMBODIMENT

Figure 1:
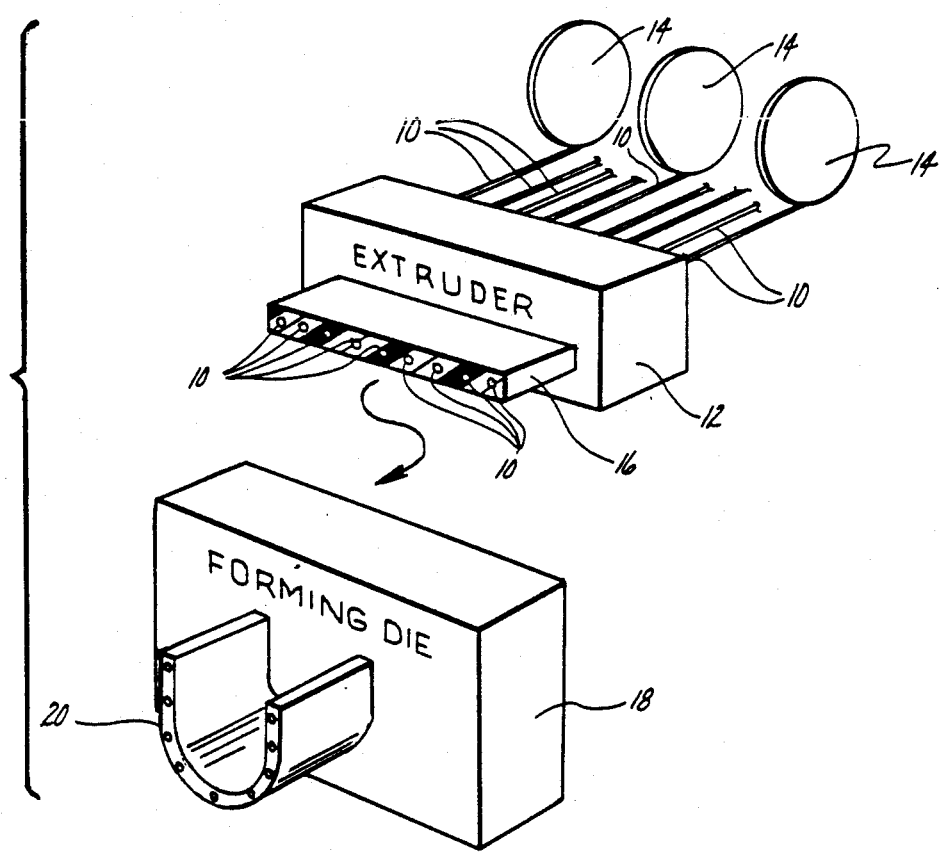
FIG. 1 is a perspective diagrammatic view illustrating general principles of the present invention.

FIG. 1 is a perspective view illustrating in diagrammatic manner general principles of the invention.

A plurality of individual wires 10 are passed through an extruder 12. The wires may be taken from reels 14 for convenient loading of the extruder. FIG. 1 illustrates only three such reels and it will be appreciated that there will typically be a number of reels corresponding to the number of individual wires.

Extruder 12 is a conventional machine, a cross head extruder, which receives raw plastic from a suitable source and which acts upon the raw plastic to produce the plastic extrusion. The extruder is provided with a cross sectional shape such that as the wires pass through it, plastic material 16 is extruded onto wires 10. The plastic forms a body joining all wires and the illustration in FIG. 1 shows the wires in cross section to be fully encapsulated by the plastic body. The procedure illustrated in FIG. 1 extrudes the plastic in the flat onto the wires which are arranged parallel and spaced apart at generally uniform spacing intervals.

One of the desired cross sectional shapes for an edge guard is a U-shaped cross section and therefore the extruded material leaving extruder 12 is passed through forming die 18 while the plastic material is still formable so as to form a generally U-shaped cross section 20 constituting the desired shape of the edge guard. The U-shaped cross section is set by appropriate cooling of the plastic. The U-shaped material may be cut to desired lengths for use in particular applications.

Figure 4:
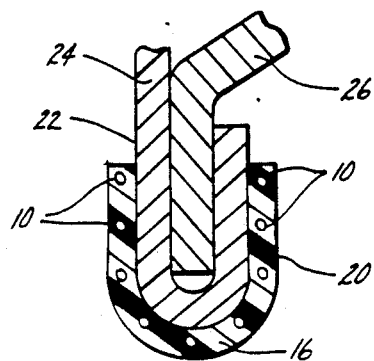
FIG. 4 is a cross sectional view through an edge guard made in accordance with the principles disclosed in FIG. 1 and illustrating the edge guard installed on an edge.

FIG. 4 illustrates the edge guard of U-shaped cross section 20 applied to the edge 22 of an object. Edge 22 is shown as the trailing edge of a swinging closure of an automobile such as an automobile door. The construction of edge 22 is typical of current practice in that the door comprises an outer door panel 24 and an inner door panel 26 with the marginal edge of the outer panel being wrapped around the marginal edge of the inner panel. The edge guard 20 is dimensioned to fit onto this door edge construction in the manner depicted in FIG. 4.

As mentioned above, one of the important improvements in edge guards in that any metal of the edge guard is insulated from the metal of the door. The construction depicted in FIG. 4 insulates the wires 10 from the door edge because the wires are fully encapsulated by the plastic material. While metal is one suitable material for wires 10 and hence would preferably have full encapsulation by plastic, it is possible that the wires could be of another material which would not give rise to the potential for corrosive electrochemical action with the metal of the door. For example, it is contemplated that the wires could be a suitable plastic.

The combination of the plastic and the wires is effective to create a construction for an edge guard which permits improved handling and installation of an edge guard yet which minimizes the amount of material which has to be used, and yet is effective in performance. The wires by themselves would not be suitable for an edge guard. Plastic by itself is suitable for an edge guard only if it is above a certain thickness because of the difficulty in handling thin films of plastic. The invention provides a thin yet very functional construction.

While it would be possible in accordance with the principles of the invention to have the edge guard so constructed as to be self-retaining, it is deemed desirable to utilize an additional medium such as a suitable adhesive to adhesively secure the edge guard to the edge of the door. This can be done, for example, by coating the interior of the U-shaped cross section with a suitable adhesive, covering the adhesive with a release paper, and then stripping the release paper from the edge guard at the time that it is to be installed on an edge.

A still further advantage of the invention is that it is possible to impart desired color characteristics to the edge guard through suitable coloration of suitable plastic materials for the plastic body of the edge guard.

Figure 2:
FIG. 2 is a cross sectional view taken in the direction of arrows 2—2 in FIG. 1 and enlarged.
Figure 3:
FIG. 3 is a cross sectional view similar to FIG. 2 illustrating another embodiment.

The dimensions of the edge guard and its component parts including the number and arrangement of the wires, will depend upon specific requirements for given applications. Those shown in the drawing are intended to be representative. For example, FIG. 2 illustrates wires 10 being of metal and of circular cross section. FIG. 3 illustrates an alternate construction in which the wires 28 are of semi-circular cross section. The semi-circular cross section may be useful in certain situations. For example, the semi-circular wires can be arranged in the manner shown in FIG. 5 wherein the flat planar surfaces of the semi-circles face toward the interior of the U-shaped edge guard cross section and the semi-circular surfaces face outwardly of the U-shaped cross section. Thus, the flat planar surfaces may, for certain usages, be more conforming to the edge onto which the edge guard is to be installed.

Figure 5:
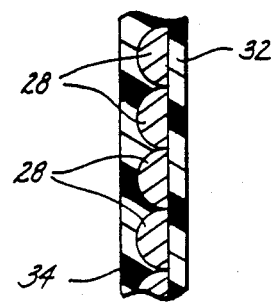
FIG. 5 is a fragmentary enlarged view illustrating an alternate construction for an edge guard in accordance with principles of the invention.

FIG. 5 also illustrates a construction which demonstrates that it is not necessary to co-extrude onto the edge guards the entire plastic body in one operation. For example, the plastic may be extruded as two separate layers 32, 34. FIG. 5 illustrates the interior layer 32 as being applied over the flat surfaces of the semi-circular cross sections of the individual wires. The semi-circular surfaces of the wires are encapsulated by the exterior layer 34 with this latter plastic material presenting the outward appearance of the U-shaped cross section when the edge guard is installed on an edge. Accordingly, it is this latter material which may be colored as desired or endowed with other particular characteristics which may be different from the characteristics of the layer on the interior of the cross section. Depending upon the characteristics of the two plastic materials, they may be extruded one onto the other directly or with the use of any suitable piece of material. While FIG. 5 illustrates the two layer construction as applied to the wires of semi-circular cross section, it will be appreciated that the double layer extrusion procedure may be used with wires of other than this particular cross section. The relative proportions of the layers and their relation to the wires may also be selected as desired.

FIG. 6 illustrates in diagrammatic manner, another application of principles of the invention. Extruder 12 and forming die 18 are illustrated in FIG. 6. Instead of the separate individual wires 10 as in FIG. 1, the wires are contained as a part of a wire mesh screen 36. The wire mesh screen 36 is passed through the extruder and the plastic material 38 is extruded onto the wire mesh screen to form the composite material for the edge guard. FIG. 6 illustrates the extrusion to be in the flat and with the flat extrusion being subsequently formed into a U-shaped cross section 40 by means of forming die 18. FIG. 6 shows the wire mesh screen as being fully encapsulated by the plastic material. While this represents one suitable form, it is possible for other modified forms to be created using the invention.

FIG. 7 illustrates one such modified form 42 in cross section leaving extruder 12. Although FIG. 7 illustrates the cross section of the plastic material as not intruding into the wire mesh screen, this is solely for convenience and clarity in illustration of the drawing figures. The plastic material is extruded onto the wire mesh screen in the manner so that one face of the wire mesh screen (the top face in FIG. 7) is fully covered by insulation. The plastic is also formed around the longitudinally extending edges of the wire mesh screen and onto the margins of the opposite side. This yields a construction in which the screen is partially visible from the exterior when the cross section of FIG. 7, which is in the flat, is subsequently formed to the U-shaped cross section shown in FIG. 8. With this construction beads are provided at the ends of the legs of the U-shaped cross section and the screen is partially visible on the exterior. This construction, in addition to providing the functional and performance attributes referred to above, also may be considered to possess a decorative appearance. This is created through the visibility of the screen and depending upon the degree of exposure the mesh of the screen and other various factors, this may coact with the appearance of the plastic. In other words, it is possible that the exterior appearance may be essentially that of the screen. Alternatively it is possible for the exterior appearance to be a combination of screen and plastic. Of course, where the plastic fully encapsulates the screen, the appearance will be that of plastic.

As described above in connection with FIG. 5 it is possible to construct an edge guard containing a screen which has two different layers of plastic having different characteristics. Screen is deemed a desirable material from the standpoint that it is relatively light in weight yet it provides body to an edge guard, and that it may for certain situations be deemed easier to handle for manufacturing purposes. For example, the screen could be made of metal having a silver or gold or bronze or other color.

Like the embodiments described above using the individual wires, the embodiment of edge guard using a screen could be made self-retaining but it is deemed preferable to utilize adhesive for mounting of the edge guard on an edge. The adhesive is applied to the interior of the U-shaped cross section, covered by release paper and the release paper is stripped to expose the adhesive at the time of installation.

The invention endows an edge guard with the ability to conform to an edge having compound curvature, and this can eliminate the need for manufacturing operations which would be required for other types of edge guards. The degree of stiffness and flexibility is determined by the design of the individual components. Any suitable plastic may be used. For example polyvinylchloride is one such material. Where there are plural plastic layers, the inner layer can be polyvinylchloride and the outer layer a different material such as a fluoridated plastic, polyvinylfluoride for example.

While a preferred embodiment of the invention has been disclosed, it will be appreciated that principles are applicable to other embodiments.

What is claimed is:

1. A method of making a plastic and wire door edge guard which comprises passing a plurality of three or more parallel wires arranged in a common plane through an extruder, extruding plastic in the flat onto said wires as they pass through the extruder to form a flat plastic body containing said wires, and then while the extruded plastic body is still formable, forming the flat plastic body into a desired cross sectional shape for the edge guard by an additional forming step, and in which said additional forming step comprises passing the plastic body through a forming die to thereby impart a generally U-shaped cross section to the edge guard, said generally U-shaped cross section comprising a generally semi-circular base and inner and outer legs extending from said base, and said generally U-shaped cross section being formed to dispose at least one wire in said inner leg, at least one wire in said outer leg and at least one wire in said base, and wherein the plastic is extruded onto the wires such that the interior of the U-shaped cross section comprises only plastic.

2. A product made by the method of claim 1 in which said wires are generally uniformly spaced apart.

3. A product made by the method of claim 1 in which said wires are fully embedded within the plastic body.

4. A product made by the method of claim 1 in which said wires are of circular cross section.

5. A product made by the method of claim 1 in which said wires are of non-circular cross section.

6. A product made in the method of claim 1 in which said wires are of semi-circular cross section and the flat faces of the semi-circular cross sections of the wires face toward the interior of the U-shaped cross section and the plastic body covers the flat faces of the semi-circular applying an additional layer to said body of a material having a physical characteristic different from the corresponding characteristic of the material of said body. cross sections of the wires for insulating the wires from an edge on which the edge guard is to be mounted.

7. A product made by the method of claim 1 in which at least a portion of said wires are visible from the exterior of the U shaped cross section.

8. A product as set forth in claim 7 in which said wires are part of a wire mesh screen.

9. A product made by the method of claim 1 in which said wires are part of a wire mesh screen, said method including extruding plastic in the flat onto the wire screen to fully cover one side of the screen, the longitudinal edges of the screen and the margins on the opposite side of the screen so as to leave a portion of the screen exposed on said opposite side of said screen, said body and screen being formed into a generally U-shaped cross section such that said one side of said screen is toward the interior of the U-shaped cross section and the plastic covering the margins of said other side of said screen form beads.

10. A product made by the method of claim 1 in which said wires are part of a wire mesh screen.

11. A product in accordance with claim 10 in which a portion of the screen is visible from the exterior of the U-shaped cross section.

12. A method as set forth in claim 1, said plastic being extruded as two separate layers.

13. A method as set forth in claim 12, said two separate layers being of different material.

14. A method as set forth in claim 1, including applying an additional layer to said body of a material having a physical characteristic different from the corresponding characteristic of the material of said body.

* * * * *